United States Patent
Nagra (10) Patent No.: US 12,052,465 B2
(45) Date of Patent: Jul. 30, 2024

(54) DIGITAL CONTENT MODERATION

(71) Applicant: Haazoyi Investments Ltd., Vancouver (CA)

(72) Inventor: Gurpreet Singh Nagra, Vancouver (CA)

(73) Assignee: Haazoyi Investments Ltd., Vancouver (CA)

( * ) Notice: Subject to any disclaimer, the term of this patent is extended or adjusted under 35 U.S.C. 154(b) by 0 days.

(21) Appl. No.: 18/459,739

(22) Filed: Sep. 1, 2023

(65) Prior Publication Data
US 2024/0080519 A1    Mar. 7, 2024

Related U.S. Application Data (60) Provisional application No. 63/403,734, filed on Sep. 3, 2022.

(51) Int. Cl.
| | | |
|---|---|---|
| H04N 21/44 | (2011.01) | |
| H04N 21/442 | (2011.01) | |
| H04N 21/466 | (2011.01) | |

(52) U.S. Cl.
CPC . *H04N 21/44204* (2013.01); *H04N 21/44008* (2013.01); *H04N 21/4662* (2013.01)

(58) Field of Classification Search
None
See application file for complete search history.

(56) References Cited

U.S. PATENT DOCUMENTS

| | | |
|---|---|---|
| 7,046,139 B2 | 5/2006 | Kuhn et al. |
| 9,369,537 B1 | 6/2016 | Mathew et al. |
| 10,237,280 B2 | 3/2019 | Day, II et al. |
| 2010/0239227 A1 | 9/2010 | Bhogal et al. |
| 2012/0215328 A1 | 8/2012 | Schmelzer |
| 2014/0351846 A1* | 11/2014 | Dang ............... H04N 21/44236 725/28 |
| 2019/0019426 A1 | 1/2019 | Chambers |
| 2022/0124304 A1* | 4/2022 | Kulkarni ............... G06N 20/00 |
| 2023/0161893 A1 | 5/2023 | Day, II et al. |

OTHER PUBLICATIONS

International Search Report and Written Opinion dated Dec. 5, 2023 for PCT/IB2023/058677. 8 pages.

* cited by examiner

*Primary Examiner* — Jefferey F Harold
*Assistant Examiner* — Charles N Hicks
(74) *Attorney, Agent, or Firm* — Fox Rothschild LLP (57) ABSTRACT

Digital content moderation systems and methods are disclosed. A method includes assigning content output by an electronic device to a first category. The method further includes monitoring a first amount of time during which the electronic device is outputting the content. In response to the first amount of time exceeding a first threshold, the method includes prompting a user to switch the electronic device to output content of a different category. After prompting the user, the method includes monitoring a second amount of time during which the electronic device continues to output the content; and, in response to the second amount of time exceeding a second threshold, taking an action including at least one of: causing the electronic device to output content of a different category; or transmitting a notification indicating that the electronic device is not outputting content of a different category.

20 Claims, 5 Drawing Sheets

DIGITAL CONTENT MODERATION

CROSS-REFERENCE AND CLAIM OF PRIORITY

This patent application claims priority to U.S. Provisional Patent Application No. 63/403,734 filed Sep. 3, 2022, the disclosure of which is hereby incorporated into this document by reference in its entirety.

BACKGROUND

Parental controls are features which allow parents to restrict the access of content to their children or limit their children's screen time. These controls may assist parents in their ability to restrict certain content viewable by their children (e.g., content that is not age-appropriate), or to place time-limits on device usage. The increased use by children of mobile devices has created an increased demand for parental controls on these devices. While these systems restrict harmful content consumption, they do little to encourage healthy online-content consumption. This document describes systems configured to promote social, physical, and emotional well-being, among other capabilities.

SUMMARY

This disclosure generally relates to encouraging healthy content creation and/or consumption, including online content. In an embodiment, a method of managing digital-content consumption is disclosed. The method includes detecting first content being output by an electronic device and assigning the first content to a first category. The method further includes monitoring a first amount of time during which the electronic device is outputting the first content. The method further includes identifying one or more second categories, wherein each second category is different than the first category. In response to the first amount of time exceeding a first threshold, the method further includes prompting a user to switch the electronic device to output content associated with the one or more second categories. After prompting the user, the method further includes monitoring a second amount of time during which the electronic device continues to output the first content. In response to the second amount of time exceeding a second threshold, the method includes taking an action. The action includes at least one of: causing the electronic device to output second content, the second content associated with one of the one or more second categories; or transmitting a notification indicating that the electronic device is not outputting content associated with one of the one or more second categories.

Implementations of the disclosure may include one or more of the following optional features. In some embodiments, detecting the first content being output by the electronic device includes detecting video content being displayed on a screen of the electronic device. The first category may include at least one of educational, physical, or entertainment. In some examples, assigning the first content to the first category includes determining a source of the first content. In some examples, assigning the first content to the first category includes applying a trained machine-learning model to the first content. Monitoring the first amount of time during which the electronic device continues to output the first content may include determining an aggregate amount of time that the electronic device is outputting the first content. The notification may include a list including the one or more second categories. In some examples, causing the electronic device to output the second content includes causing the electronic device to output content associated with the highest priority category of the one or more second categories. The method may further include assigning a category to each content output by the electronic device and generating a report including an indication of a relative time that the electronic device was outputting content of each category. In some examples, the method further includes, after the electronic device begins outputting the second content, monitoring a third amount of time during which the electronic device is outputting the second content.

In an embodiment, a computer program product is disclosed. The computer program product includes a memory storing programming instructions that are configured to cause a processor to manage digital-content consumption. The programming instructions are configured to cause the processor to manage digital-content consumption by detecting first content being output by an electronic device and assigning the first content to a first category. The programming instructions are further configured to cause the processor to manage digital-content consumption by identifying one or more second categories, wherein each second category is different than the first category. The programming instructions are further configured to cause the processor to manage digital-content consumption by monitoring a first amount of time during which the electronic device is outputting the first content. The programming instructions are further configured to cause the processor to manage digital-content consumption by, in response to the first amount of time exceeding a first threshold, prompting a user to switch the electronic device to output content associated with the one or more second categories. The programming instructions are further configured to cause the processor to manage digital-content consumption by, after prompting the user, monitoring a second amount of time during which the electronic device continues to output the first content. The programming instructions are further configured to cause the processor to manage digital-content consumption by, in response to the second amount of time exceeding a second threshold, taking an action. The action includes at least one of: causing the electronic device to output second content, the second content associated with one of the one or more second categories; or transmitting a notification indicating that the electronic device is not outputting content associated with one of the one or more second categories.

Implementations of the disclosure may include one or more of the following optional features. In some examples, the programming instructions that are configured to cause the processor to manage digital-content consumption by detecting the first content being output by the electronic device includes programming instructions that are configured to cause the processor to manage digital-content consumption by detecting video content being displayed on a screen of the electronic device. The first category may include at least one of educational, physical, or entertainment. In some examples, the programming instructions that are configured to cause the processor to manage digital-content consumption by assigning the first content to the first category include programming instructions that are configured to cause the processor to manage digital-content consumption by determining a source of the first content. In some examples, the programming instructions that are configured to cause the processor to manage digital-content consumption by assigning the first content to the first category include programming instructions that are configured to cause the processor to manage digital-content consumption by applying a trained machine-learning model to the first content. In some examples, the programming instructions that are configured to cause the processor to manage digital-content consumption by monitoring the first amount of time during which the electronic device continues to output the first content include programming instructions that are configured to cause the processor to manage digital-content consumption by determining an aggregate amount of time that the electronic device is outputting the first content. The notification may include a list including the one or more second categories.

In some examples, the programming instructions that are configured to cause the processor to manage digital-content consumption by causing the electronic device to output the second content include programming instructions that are configured to cause the processor to manage digital-content consumption by causing the electronic device to output content associated with the highest priority category of the one or more second categories. In some examples, the programming instructions are further configured to cause the processor to manage digital-content consumption by assigning a category to each content output by the electronic device and generating a report comprising an indication of a relative time that the electronic device was outputting content of each category. In some examples, the programming instructions are further configured to cause the processor to manage digital-content consumption by, after the electronic device begins outputting the second content, monitoring a third amount of time during which the electronic device is outputting the second content.

BRIEF DESCRIPTION OF THE DRAWINGS

The accompanying drawings, which are incorporated herein and constitute part of this specification, illustrate various of the embodiments discussed in this document, and, together with the general description given above and the detailed description given below, serve to explain the features of the invention. In the drawings.

DETAILED DESCRIPTION

In the drawings, like numerals indicate like elements throughout. Certain terminology is used herein for convenience only and is not to be taken as a limitation on the claims. The following describes various embodiments of the present invention. However, it should be understood, based on this disclosure, that the claims are not necessarily limited by the embodiments described herein.

Increasingly, electronic devices and digital content are replacing traditional media sources such as printed books and broadcast radio/television. Tools that effectively manage access to digital content can promote learning and can promote social and emotional well-being of electronic-device users in this digital landscape. In particular, parent, educators, and others with developing children in their charge may want to encourage balanced content consumption to improve child-development outcomes.

Ideally, content creation and consumption would be in line with human evolution to date and how we would prefer humans to evolve in the future. Content is a sample of human evolution and a "model" of future generations and activities of future generations. This can be achieved by training parents, caregivers, and service providers for manual evaluation and eventually by artificial intelligence (AI) when the accuracy of AI evaluation is reliable. In other words, human evolution is embedded in digital content and consumption reinforces to the next generations. Similarly, the developmental needs of children may evolve as the child matures. However, the technical tools that deliver content simply focus on delivery, and do not consider effects that the content may have on healthy child development.

Tools and methods disclosed herein provide a technical framework for promoting healthy development and tracking progress with respect to the plan. The tracked progress itself may inform (and help evolve) future plans. For example, a ten-minute video of a child covering year 3 (12 months between ages 2 and 4), may show the child doing activities that include sitting about 90% of the time. Based on this information, and informed by natural child development, the system may suggest to, in year 4, increase the focus on activities where the child is moving. In another example, a video may show the child doing activities moving the upper body only, and the system may suggest a new goal to record more activities doing lower body activities such as riding a bike or playing soccer.

Figure 1:
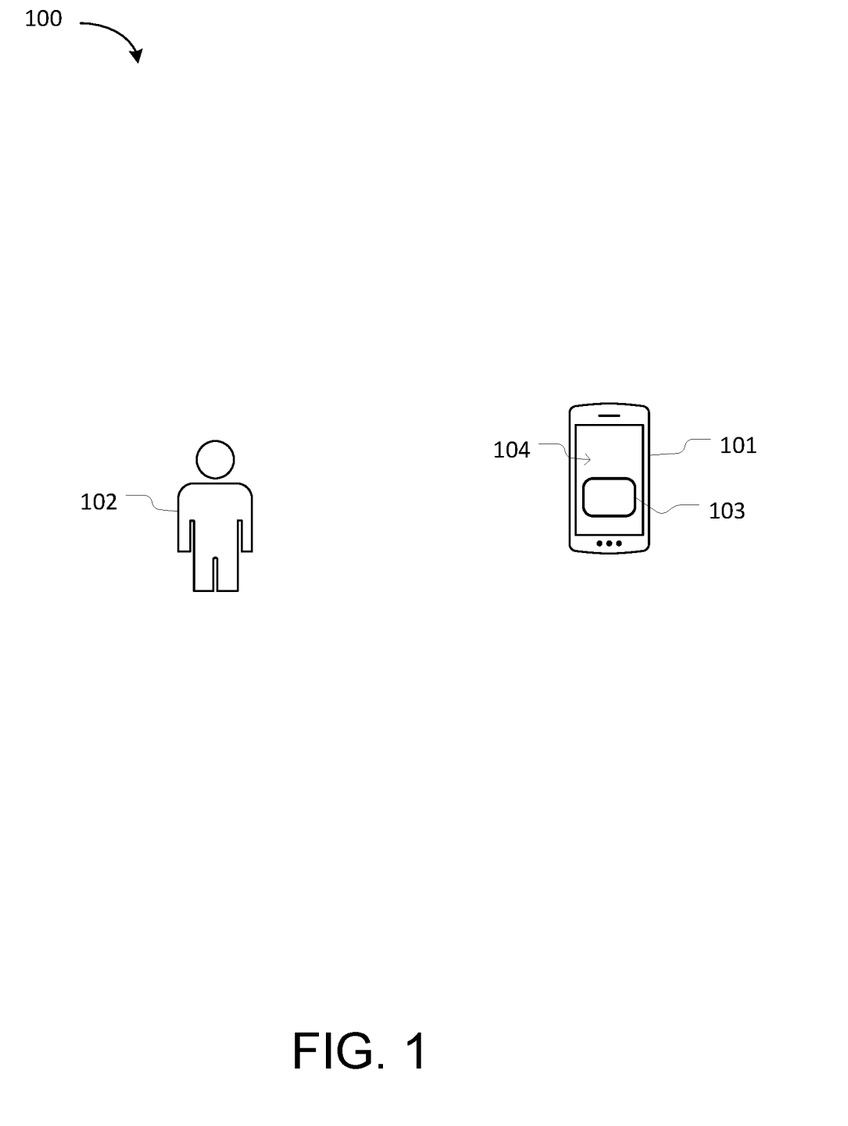
FIG. 1 shows a digital-content moderation environment.

Referring to FIG. 1, an environment 100 for digital-content moderation is shown. The environment 100 includes an electronic device 101 containing digital content 103, and a user 102. The electronic device 101 outputs the digital content 103 for the user 102 to consume. In some examples, the user 102 is a child in the charge of a parent or guardian who is responsible for their well-being. The parent may want the child to have a balanced consumption of digital content 103. That is, the parent may want the child to consume a variety of types of content 103, and may want the child to not spend too much time consuming any one particular type of content 103. The systems and methods disclosed in this document promote social and emotional well-being of children and other digital-content consumers in a number of ways, some of which are described in more detail below.

Figure 2:
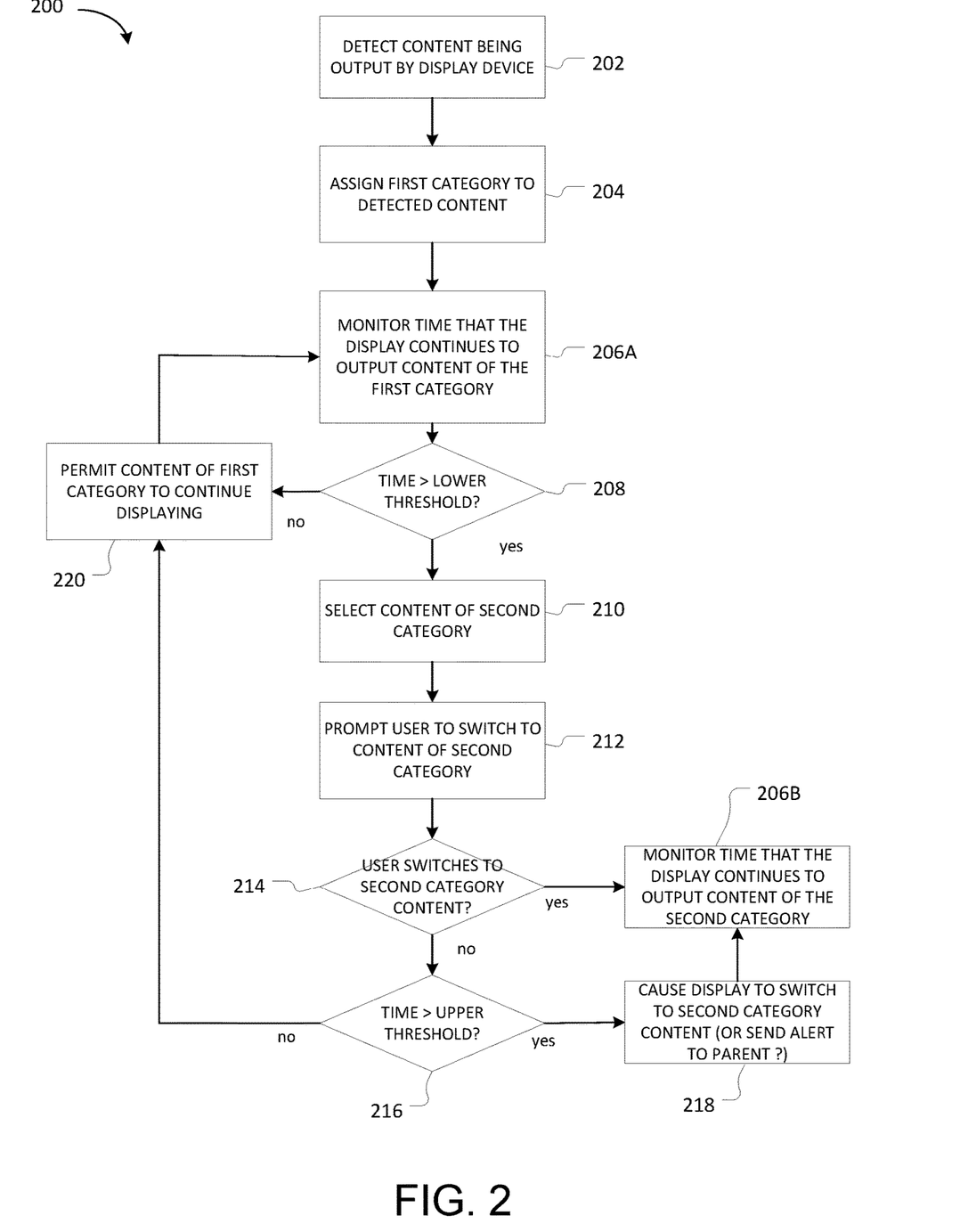
FIG. 2 shows a flowchart for an embodiment of the invention.

Referring to FIG. 2, a flowchart 200 for an example method of managing digital-content consumption is shown. The method may be implemented, e.g., by a digital-content moderation system. The content-moderation system may include an electronic device 101 configured to output the digital content 103. In some examples, the system further includes one or more remote servers and/or one or more remote sources of digital content 103.

In some examples, the digital content 103 includes a video or animation, an interactive game, readable text/symbols/characters, or other form of viewable content 103 that the electronic device 101 displays to the user 102, e.g. on a display screen. Alternatively or additionally, the digital content 103 may include music, portions of an audio book, spoken instruction, or other audio content 103 output directly by the electronic device 101 and/or through remote speakers, headphones, or the like that are interfaced with the electronic device 101. In these and other examples of digital content 103, the content 103 is output by an electronic device 101 and perceived/consumed by a user 102 of the electronic device 101. In some cases, the digital content 103 is stored on the electronic device 101 prior to being output. The electronic device 101 may receive the digital content 103, e.g., from a remote server, prior to storing the digital content 103 locally. In some examples, the electronic device 101 outputs the digital content 103 as it is received, allowing the electronic device 101 to begin outputting, or streaming, the content 103 before the entire content 103 is received.

At step 202, the method includes detecting that the electronic device 101 is outputting content 103. Step 202 may be implemented by software running directly on (or closely associated with) the electronic device 101. For example, step 202 may be implemented by an application that has been downloaded to the electronic device 101 for execution. In this example, the application may itself be outputting the content 103. That is, the application may be an educational application configured to output educational digital content 103. In other examples, application does not output the content 103 itself, but instead monitors one or more other applications that run on the electronic device 101 and which outputs the content 103, such as web browsers. In still other examples, step 202 is implemented, at least in part, by software running on a remote server. For example, a portion of step 202 may be implemented by a remote server that also provides the digital content 103 to the electronic device 101. That is, the remote server may detect the content 103 that is being provided to the electronic device 101 for output. In some examples, the remote server provides a gateway between the electronic device 101 and a remote source of digital content 103. In this case, the gateway (e.g., internet proxy server) detects content 103 provided by the remote source of digital content 103.

At step 204, the method includes assigning a first category to the content 103 being output. As discussed above with respect to step 202, the content 103 may be detected by software running directly on (or closely associated with) the electronic device 101, or the content 103 may be detected by software running on a remote server. In either case, after the digital-content moderation system or software detects the content 103 being output, the system/software assigns a category to the detected content 103 (or, as discussed later, causes another system to assign the category). In some implementations, the digital-content moderation system includes a pre-defined set of categories. Examples of content 103 categories include (but are not limited to) educational, physical health, entertainment, and the like). In some examples, the content 103 may have been labeled, tagged, titled, or otherwise associated with one or more categories. In these cases, assigning the category may include identifying the label or tag associated with the content 103. The digital-content moderation system may determine the most appropriate pre-defined category to assign based on one or more tags. In some examples, the category may be inferred from the source of the content 103. For example, in the case of the proxy-server embodiment, the proxy server may assign a category based on attributes, characteristic, or features of the remote source of the content 103. These attributes may include the domain name or address of the remote server and may also include information that can be determined from the domain name or address, such as the owner of the domain name and/or web site, the type of business the owner engages in, and so forth. Each pre-defined category may also have associated features or characteristics, such as relative priority or preferred order, and/or threshold time limits per day, week, or other time period.

In some examples, the content 103 may not be pre-labeled. In these cases, assigning the first category to the content 103 being output may include analyzing the content 103 to determine a category. For example, the method may include applying a trained machining-learning model to the content 103. In the case of video content 103, for example, the machine-learning model may have been trained by exposing the model to example videos associated with specific categories, until the machine-learning model is able to effectively recognize videos associated with each of those specific categories. A similar process may be applied to other types of video content 103 including, but not limited to, images, audio, and so forth. When the system detects new content 103 at step 202, the system may then apply the trained machine-learning model to the detected content 103. The trained machine-learning model may output the most relevant category for the content 103, which the system may then assign to the content 103.

At step 206A, the method includes monitoring the time that the electronic device 101 outputs the digital content 103. In some examples, this step 206A includes monitoring the time from when the content 103 was first detected (e.g., in step 202) until the time that new content 103 is detected. In some examples, step 206A includes monitoring the time the content 103 has been continuously output by the electronic device 101. That is, step 206A may omit monitoring the time the output has been paused for any reason. In some examples, step 206A includes monitoring the aggregate or cumulative time that content 103 is output. That is, if the user 102 switches back and forth between content 103 (or between types or categories of content 103) the system may suspend the current time monitor (e.g., monitoring the content 103 that the user 102 switched away from) and resume a previously suspended time monitor (e.g., associated with the content 103 or content category that the user 102 switched to). In each of these cases, the time the monitored time represents the time the user 102 has been consuming the content 103.

At step 208, the method includes comparing the monitored time of step 206A to a limit or threshold. That is, step 208 includes determining whether the time that the user 102 has been consuming content 103 (or a particular category of content 103) exceeds the threshold. If the threshold has not been satisfied, the method includes (at step 220) permitting the electronic device 101 to continue to output the content 103 (or the particular category of content 103) by continuing at step 206A. If the threshold has been exceeded, the method continues at step 210.

At step 210, the method includes selecting a second category of content 103 that is different than the first category. For example, the digital-content moderation system may include a pre-defined list of content categories and associated priorities (among other aspects). Selecting the second category of content 103 may include selecting the highest priority category from the list that is different from the first category. For example, the pre-defined list of content categories and associated priorities may include: "Educational": 1; "Entertainment": 3; and "Physical": 2. If the first category is "Physical," then the categories that are different than "Physical" include "Educational" and "Entertainment." Of these two categories, "Educational" has the highest associated priority, because 1 is greater than 3. In some examples, the digital-content moderation system includes a preferred order, in which case selecting the second category of content 103 includes selecting the next category in the preferred order. Selecting the second category may also be based on prior history of content consumption by the user 102, or may be determined by an algorithm. As explained in more detail below, with respect to step 212, selecting the second category may be based in part by input from the user 102.

At step 212, the method includes prompting the user 102 to switch to the second category. In a preferred embodiment, the digital-content moderation system permits the electronic device 101 to continue to output the content 103 of the first category until the user 102 switches to content 103 of the second category. That is, the prompt encourages the user 102 to switch to the second category, but does not disable or interfere with the electronic device 101 at this step. In other embodiments, the digital-content moderation system may pause the output until the user 102 responds to the prompt. The prompt may be in the form of text that appears on the display of the electronic device 101 (e.g., a popup window), or an audible message output by the electronic device 101. As alluded to above, the prompt may include a choice of potential second categories for the user 102 to select from. That is, the prompt may include two or more categories that are different than the first category, for example in the form of a drop-down list or other suitable presentation and/or selection format. The digital-content moderation system may select and order the two or more categories for presentation based on priority or other algorithm as described in relation to step 210.

At step 214, the method includes determining whether the electronic device 101 is outputting content 103 from the second category, as evidence that the user has begun consuming content 103 from the second category. This step may have similarities with steps 202 and/or 204. That is, the digital-content moderation system may detect that the electronic device 101 is outputting content 103, assign a category to the content 103, then determine whether the assigned category matches the second category (or any one of the two or more several potential second categories). If the electronic device 101 is outputting content 103 from the second category (i.e., if the user 102 has begun consuming content 103 from the second category), the method continues at step 206B. Step 206B includes monitoring the time that the electronic device 101 continues to output content 103 of the second category. That is, step 206B is analogous to step 206A, but for content 103 of the second category, rather than content 103 of the first category, as in the case of step 206A. The method may further includes prompting the user 102 to switch to a third category of content 103 after a threshold period of time, analogous to steps 208-212. However, the threshold period of time (e.g., time limit) for the second category may be different than for the first category. As discussed above, each category may have its own associated time limit that may differ from the time limit(s) of other categories.

If the electronic device 101 is not outputting content 103 from the second category (e.g., if the electronic device 101 continues to output content 103 of the first category), the method continues at step 216. At step 216, the method includes monitoring the period of time (since the time the user 102 was prompted to switch to the second category) that the electronic device 101 is not outputting content 103 from the second category. That is, the digital-content moderation system may monitor the elapsed time since the electronic device 101 presented the prompt to the user 102 without the user 102 switching to content 103 of the second category. In an alternative embodiment, the digital-content moderation system may monitor the aggregate time that the electronic device 101 continues to output content 103 of the first category since the time the user 102 was prompted to switch to the second category, e.g., excluding time the content 103 was paused. At step 216, the method also includes comparing the monitored time to a threshold period of time for switching to the second content. That is, step 216 may have similarities to steps 206A and 208. However, the time limit for the user 102 to switch to a different category (after being prompted) may be very different than the threshold period of time limiting how long the user 102 may consume content 103 of any one category. This time limit for switching to a different category may be category-specific. That is, the time limit may be a pre-defined characteristic of the category being switch away from (and/or the category being switched to).

If the user 102 has switched to the second category within the threshold period of time, e.g., if the electronic device 101 does begin outputting content 103 from the second category within the threshold time limit for switching to the second category, the method includes permitting the electronic device 101 to continue outputting content 103 of second category and to monitor the time that the electronic device 101 outputs the content 103. That is, the method proceeds to step 206B. However, if the monitored time since the user 102 was prompted to switch categories is greater than the threshold time for switching, the method continues at step 218. At step 218, the method includes providing a notification that the user 102 has not switched to content 103 from the second category and/or causing the display 104 of the electronic device 101 to begin outputting content 103 from the second category. For example, the notification may be an e-mail, text message, or other form of electronic communication to a parent or guardian or other person who is responsible for the well-being of the user 102. In some examples, the digital-content moderation system associates one or more notification recipients, and their associated contact information, with each user 102. For example, the digital-content moderation system may permit notification recipients to register their contact information with an account associated with the user 102. The notification may include details such as how long the content 103 of the first category has been playing, what the second category or potential second categories are, how much time has elapsed since the prompt was presented to the user 102, etc.

In the case where the method includes causing the electronic device 101 to begin outputting content 103 from the second category, the method includes permitting the electronic device 101 to continue outputting content 103 of second category and, as above, monitor the time that the electronic device 101 outputs the content 103 and proceed to step 206B. In some embodiments, the digital-content moderation system makes a log or record of the content 103 selected by the user 102 when prompted to change content. The digital-content moderation system may analyze such logs, e.g., using machine learning to predict content 103 that the user 102 might select for any particular category. In the case where the method includes causing the electronic device 101 to begin outputting content 103 from the second category, the method may include selecting particular content 103 to output based on the analysis of the user's past selections for a relevant category. In some embodiments, the digital-content moderation system may impose aggregate limits for specific time periods. That is, the digital-content moderation system may enforce a total amount of content consumption for a particular category per day, week, month, or other time period. In this case, when the aggregate consumption limit has been reached, the digital-content moderation system may "lock out" the electronic device 101 from outputting content 103 from the locked-out category until the time period has elapsed. In this case, the digital-content moderation system may cause the electronic device 101 to begin outputting content 103 from the a category that is not locked out (e.g., even if the locked-out category is a higher priority).

Figure 3A:
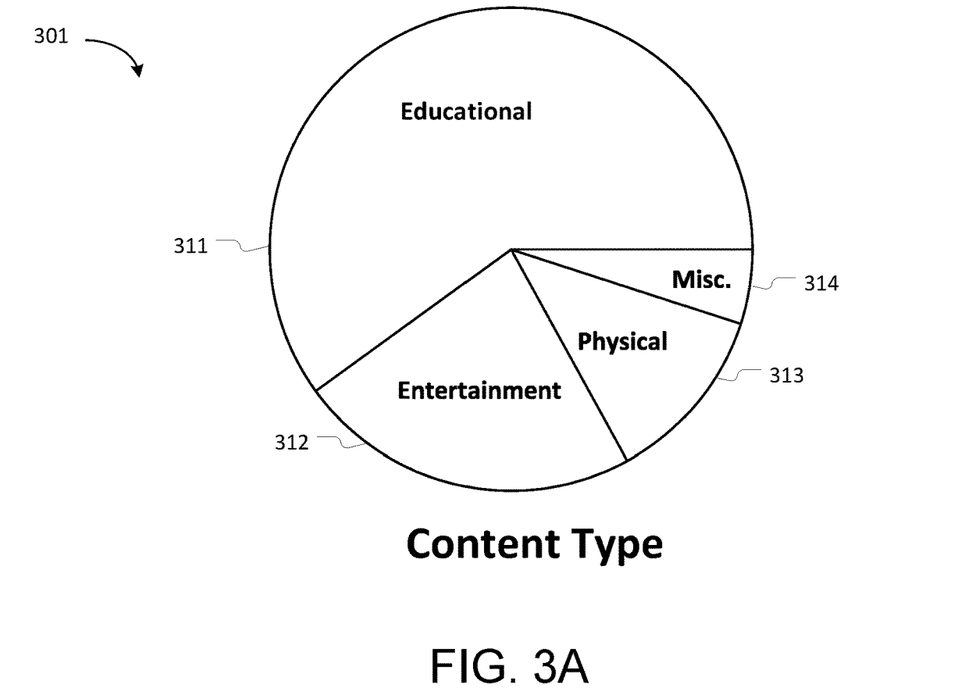
FIGS. 3A and 3B show example pie charts.
Figure 3B:
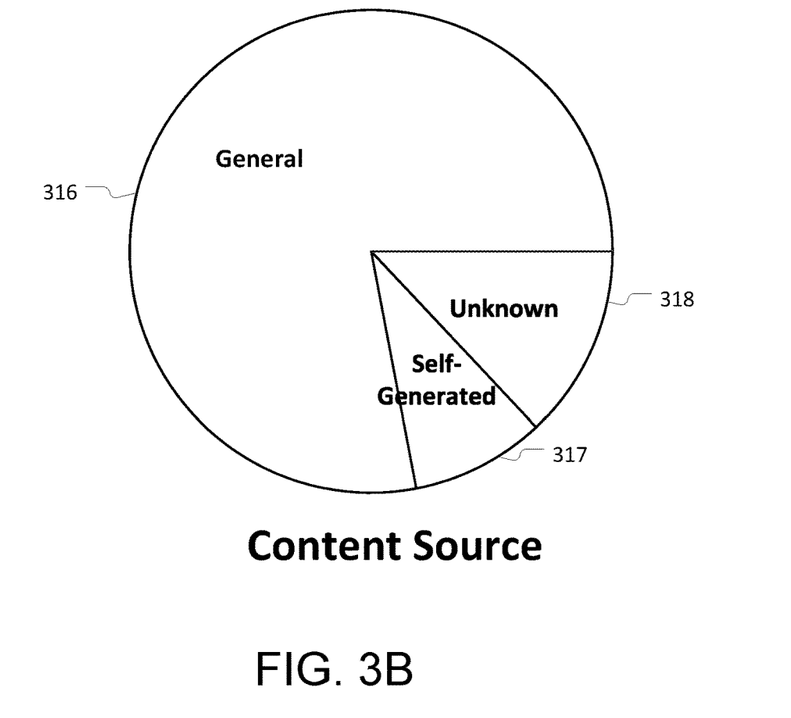

In some examples, the method further includes reporting, e.g., to the parent or guardian, information related to content 103 output by the electronic device 101. In some examples, reports may be generated periodically, such as at the end of each day, week, and/or month. Reports may also be generated on demand and/or in response to an event, such as a time threshold being exceeded or the like. Referring to FIG. 3A, the report may include an indication, such as a pie chart 301, of the relative time the electronic device 101 has been outputting content 103 of each category. The example pie chart 301 of FIG. 3A shows the relative time that the electronic device 101 output content 103 of the categories "Educational," 311 "Entertainment," 312 "Physical," 313 and "Other" (miscellaneous) 314. The report may also include suggestions for improving the balance of content 103 consumed by the user 102. In some examples, content 103 may be associated with a main category, e.g., used by the method to enforce time limits. Content 103 may also be associated with one or more additional or ancillary categories. The report may include the additional categories in the pie chart to provide a more comprehensive indication of the content 103 consumed by the user 102. Reports may include additional information relevant to the well-being of the user 102, beyond the category of the content 103, such as whether the content 103 was developed by the user 102 or a family member, such as a parent relating a story or a video of the user's family engaging in an event, as opposed to general content 103. Referring to FIG. 3B, the report may provide this additional data in the form of a table, graph or pie chart 302. The example pie chart 302 of FIG. 3B shows the relative amount of time the electronic device 101 output general content 316 as opposed to self-generated (or family-member generated) content 317 or content whose provenance is unknown 318. As discussed above, the electronic-device output is indicative of content consumption of the user 102, but is more readily controlled and objectively monitored by the digital-content moderation system.

Figure 4A:
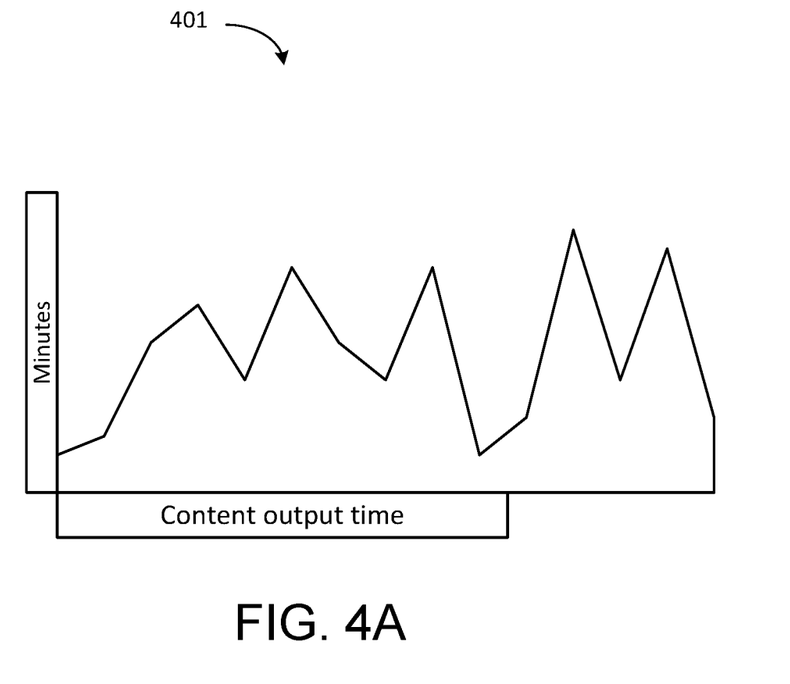
FIGS. 4A and 4B show example line graphs.
Figure 4B:
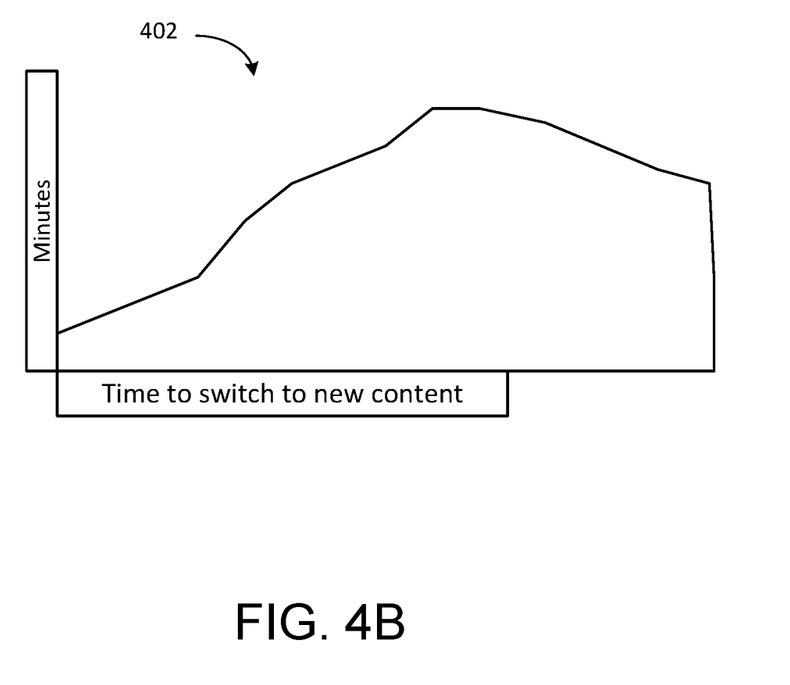

The reports may include additional analysis of the user's behavior. For example, the digital-content moderation system may analyze logs or other records of content selection, start/stop times of the electronic device 101 outputting content 103, responsiveness of the user 102 to prompts to change contents, and so forth. As a result of the analysis, the digital-content moderation system may include, in the report, suggested content 103 or content categories for improved user well-being. Referring to FIG. 4A, an example line graph 401 shows a time-ordered values of the time that the electronic device 101 output content 103 of one category before switching to another category. This example graph may provide some indication of how engaged the user 102 was. The example histogram 402 of FIG. 4B shows the relative frequency of the time period between when the user 102 is prompted to switch to different content and when the electronic device 101 begins outputting the new content 103. That is, the histogram shows the responsiveness of the user 102 to the prompt. The report may also contain other graphs, charts, tables, and so forth that convey information that has been collected and/or logged by the digital-content moderation system and analyzed and/or processed for display.

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 5.

Figure 5:
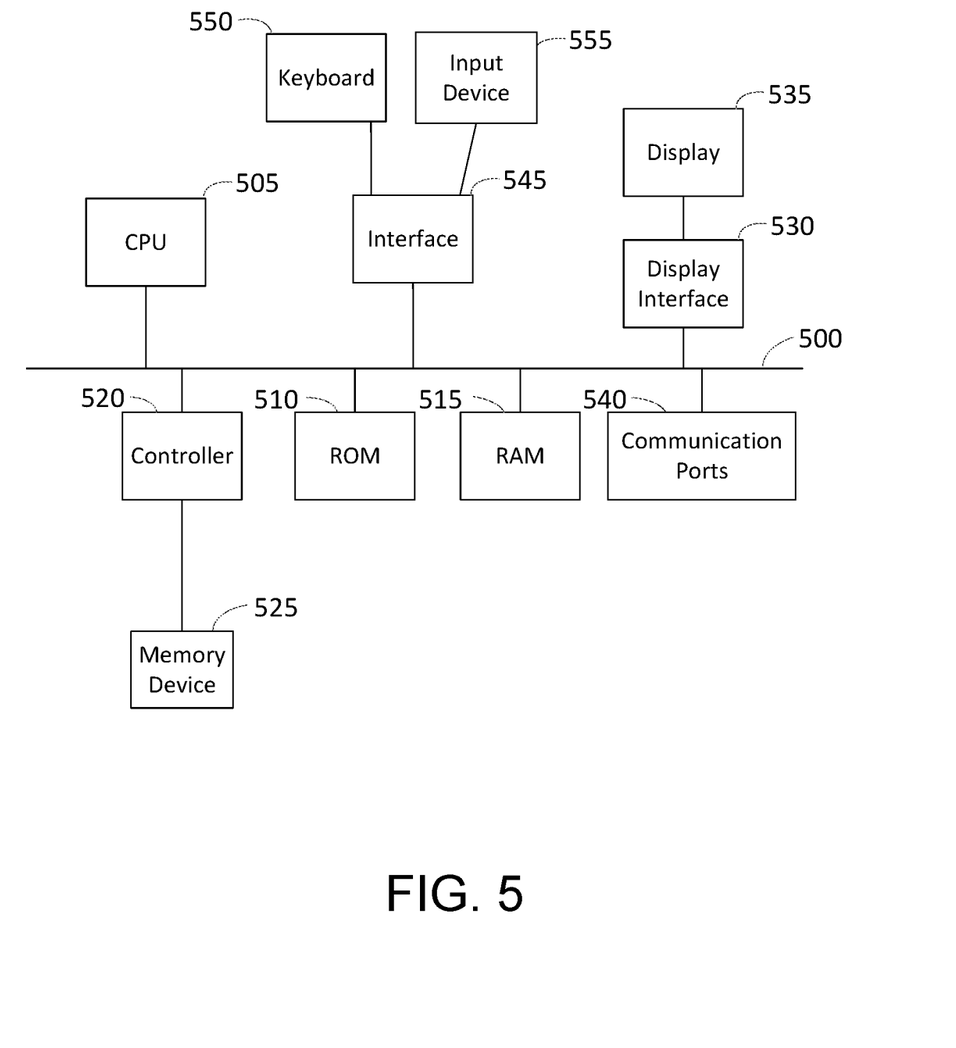
FIG. 5 depicts various embodiments of one or more electronic device for implementing the various methods and processes described herein.

FIG. 5 depicts an example of internal hardware that may be included in any of the electronic components of the system, such as the user's smartphone or a local or remote computing device in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM) 510, random access memory (RAM) 515, flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device 540 may be configured to be communicatively connected to a communications network, such as the Internet, a local area network or a cellular telephone data network.

The hardware may also include a user interface sensor 545 that allows for receipt of data from input devices 555 such as a keyboard 550, a mouse, a joystick, a touchscreen, a touch pad, a remote control, a pointing device and/or microphone. Digital image frames also may be received from a camera 520 that can capture video and/or still images, such as a high definition camera that incorporated into the user electronic device 101.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method of managing digital-content consumption, the method comprising:
   receiving, by an internet proxy server, first content from a remote source and providing the first content to an electronic device, causing the electronic device to output the first content;
   assigning, by the internet proxy server, the first content to a first category based on characteristics associated with the remote source or the first content, wherein the first category is one of a set of predefined categories;
   identifying, by the internet proxy server, one or more second categories of the set of predefined categories, wherein each second category is different than the first category;
   monitoring, by the internet proxy server, a first amount of time during which the internet proxy server is providing the first content to the electronic device for output;
   in response to the first amount of time exceeding a first threshold, providing a message to the electronic device, causing the electronic device to prompt a user to switch the electronic device to output content associated with the one or more second categories;
   after providing the message to the electronic device, monitoring a second amount of time during which the internet proxy server continues to provide the first content to the electronic device; and
   in response to the second amount of time exceeding a second threshold, taking an action comprising at least one of:
      providing, by the internet proxy server, the second content to the electronic device, causing the electronic device to output second content, the second content associated with one of the one or more second categories; or
      transmitting a notification indicating that the electronic device is not outputting content associated with one of the one or more second categories.

2. The method of claim 1, wherein detecting the first content being output by the electronic device comprises detecting video content being displayed on a screen of the electronic device.

3. The method of claim 1, wherein the first category comprises at least one of educational, physical, or entertainment.

4. The method of claim 1, wherein assigning the first content to the first category comprises determining a source of the first content.

5. The method of claim 1, wherein assigning the first content to the first category comprises applying a trained machine-learning model to the first content.

6. The method of claim 1, wherein monitoring the first amount of time during which the electronic device continues to output the first content comprises determining an aggregate amount of time that the electronic device is outputting the first content.

7. The method of claim 1, wherein the notification comprises a list comprising the one or more second categories.

8. The method of claim 1, wherein causing the electronic device to output the second content comprises causing the electronic device to output content associated with a highest priority category of the one or more second categories.

9. The method of claim 1, further comprising:
   assigning a category to each content output by the electronic device; and
   generating a report comprising an indication of a relative time that the electronic device was outputting content of each category.

10. The method of claim 1, further comprising, after the electronic device begins outputting the second content, monitoring a third amount of time during which the electronic device is outputting the second content.

11. A computer program product comprising a memory storing programming instructions that are configured to cause a processor to manage digital-content consumption by:
   receiving, by an internet proxy server, first content from a remote source and providing the first content to an electronic device, causing the electronic device to output the first content;
   assigning, by the internet proxy server, the first content to a first category based on characteristics associated with the remote source or the first content, wherein the first category is one of a set of predefined categories;
   identifying, by the internet proxy server, one or more second categories of the set of predefined categories, wherein each second category is different than the first category;
   monitoring, by the internet proxy server, a first amount of time during which the internet proxy server is providing the first content to the electronic device for output;
   in response to the first amount of time exceeding a first threshold, providing a message to the electronic device, causing the electronic device to prompt a user to switch the electronic device to output content associated with the one or more second categories;
   after providing the message to the electronic device, monitoring a second amount of time during which the internet proxy server continues to provide the first content to the electronic device; and
   in response to the second amount of time exceeding a second threshold, taking an action comprising at least one of:
      providing, by the internet proxy server, the second content to the electronic device, causing the electronic device to output second content, the second content associated with one of the one or more second categories; or transmitting a notification indicating that the electronic device is not outputting content associated with one of the one or more second categories.

12. The computer program product of claim 11, wherein the programming instructions that are configured to cause the processor to manage digital-content consumption by detecting the first content being output by the electronic device comprise programming instructions that are configured to cause the processor to manage digital-content consumption by detecting video content being displayed on a screen of the electronic device.

13. The computer program product of claim 11, wherein the first category comprises at least one of educational, physical, or entertainment.

14. The computer program product of claim 11, wherein the programming instructions that are configured to cause the processor to manage digital-content consumption by assigning the first content to the first category comprise programming instructions that are configured to cause the processor to manage digital-content consumption by determining a source of the first content.

15. The computer program product of claim 11, wherein the programming instructions that are configured to cause the processor to manage digital-content consumption by assigning the first content to the first category comprise programming instructions that are configured to cause the processor to manage digital-content consumption by applying a trained machine-learning model to the first content.

16. The computer program product of claim 11, wherein the programming instructions that are configured to cause the processor to manage digital-content consumption by monitoring the first amount of time during which the electronic device continues to output the first content comprise programming instructions that are configured to cause the processor to manage digital-content consumption by determining an aggregate amount of time that the electronic device is outputting the first content.

17. The computer program product of claim 11, wherein the notification comprises a list comprising the one or more second categories.

18. The computer program product of claim 11, wherein the programming instructions that are configured to cause the processor to manage digital-content consumption by causing the electronic device to output the second content comprise programming instructions that are configured to cause the processor to manage digital-content consumption by causing the electronic device to output content associated with the highest priority category of the one or more second categories.

19. The computer program product of claim 11, wherein the programming instructions are further configured to cause the processor to manage digital-content consumption by:

assigning a category to each content output by the electronic device; and generating a report comprising an indication of a relative time that the electronic device was outputting content of each category.

20. The computer program product of claim 11, wherein the programming instructions are further configured to cause the processor to manage digital-content consumption by, after the electronic device begins outputting the second content, monitoring a third amount of time during which the electronic device is outputting the second content.

* * * * *